Patented Mar. 17, 1953

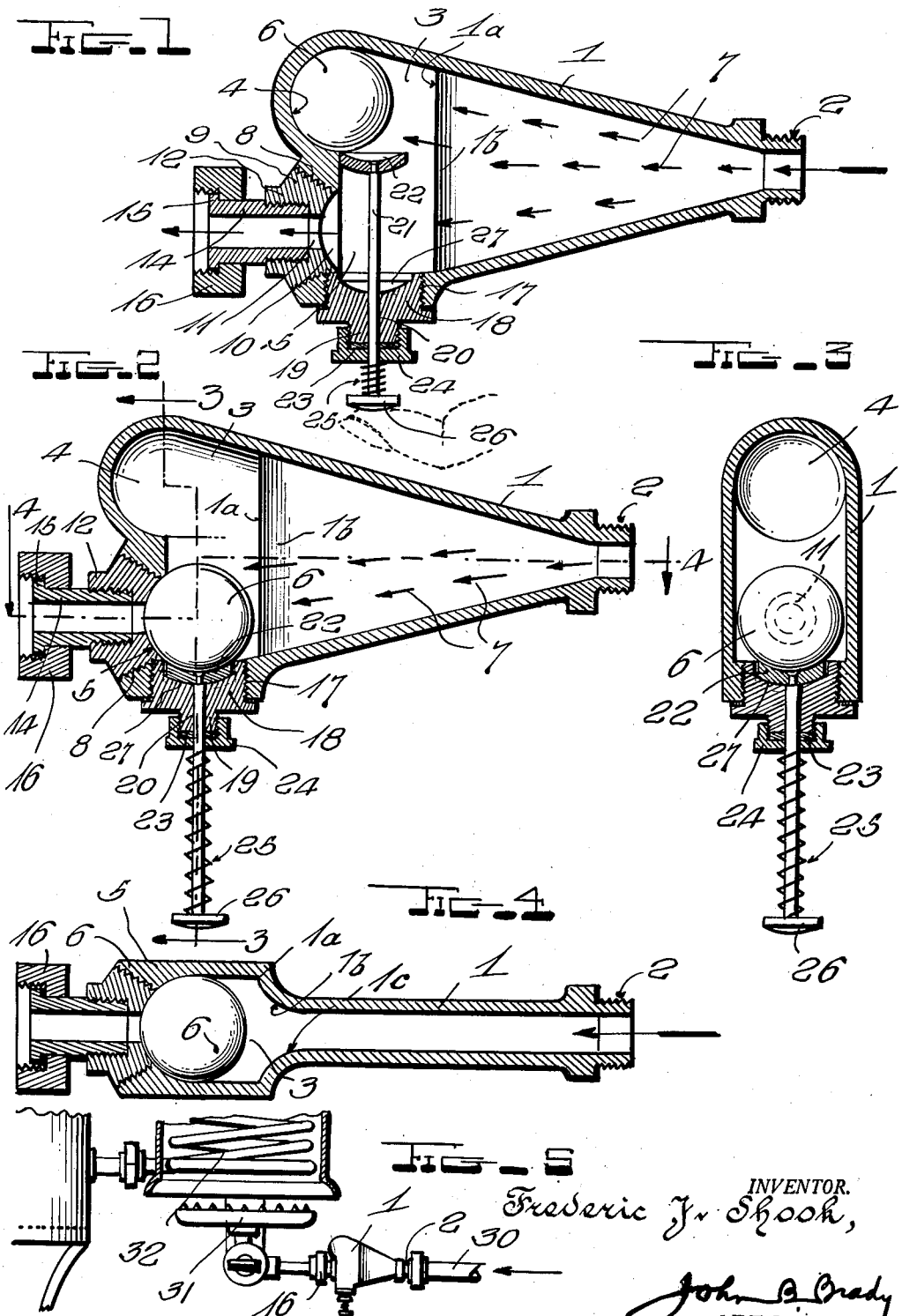

2,631,603

UNITED STATES PATENT OFFICE 2,631,603

GAS SAFETY VALVE

Frederic J. Shook, Grand Prairie, Tex.

Application April 26, 1948, Serial No. 23,210

3 Claims. (Cl. 137—466)

My invention relates broadly to valves and more particularly to a construction of a gas safety valve applicable for use on a gas stove or appliance as well as on a gas lead line to any building.

One of the objects of my invention is to provide a valve mechanism for eliminating the danger usually associated with leaving a gas stove or appliance burning while unwatched.

Another object of my invention is to provide a construction of safety valve for gas appliances embodying a safety shut-off for gas under conditions where gas flow may fail, extinguishing the flame whereupon the gas upon reestablishment of flow might otherwise escape through unlighted burners.

A further object of my invention is to provide a manually resettable gas valve mechanism for reconditioning a gas distribution system for the flow of gas subsequent to the failure of the gas supply and the initial automatic safety cut-off of the gas distribution system.

Still another object of my invention is to provide a construction of gravity actuated gas shut-off valve mechanism for automatically cutting off the gas distribution system upon failure of the flow of gas in combination with a manually controlled spring actuated reset mechanism for reconditioning the gas distribution system for operation when the gas flow is reestablished.

Other and further objects of my invention reside in the construction of safety shut-off valve as set forth more fully in the specification hereinafter following by reference to the accompanying drawings, in which:

Figure 1 is a cross-sectional view showing the normal operating position of the parts of the safety valve of my invention during normal gas flow to a gas distribution system, and after the valve has been manually reset after the reestablishment of the gas flow; Fig. 2 is a view of the valve showing the parts in cut-off position after a gas supply failure and showing the parts in position when the gas supply has been reestablished; Fig. 3 is a vertical sectional view taken substantially on line 3—3 of Fig. 2; Fig. 4 is a horizontal sectional view taken substantially on line 4—4 of Fig. 2; and Fig. 5 shows one application of the gas safety valve of my invention to a conventional domestic gas heater installation.

My invention is directed to a safety device which may save human life from asphyxiation, and property loss from fire due to failing gas pressure, either natural or artificial. The device is designed to attach to the conventional gas heater, but can be adapted to any type of gas stove. The body of the valve structure is formed from brass or stainless steel, or other rust-proof material, which eliminates possibility of rusting or corrosion; and the ball seat or check is of alloy to insure against corrosion. The valve mechanism comprises a valve body or housing including a chamber having a ball valve seat portion and a ball valve recess portion with which a ball valve is arranged to coact with means for manually removing a ball valve from the ball valve seat portion after the operation of the valve as a cut-off due to failure of the gas flow to the ball valve recess portion above the ball valve seat portion for restoring the valve for operation after reestablishment of the gas flow.

Referring to the drawing in more detail, reference character 1 designates the valve housing of the valve construction of my invention, the valve body being tapered from the screw-threaded supply connection end 2 thereof to a position designated at 1a to form substantially parallel flat spaced walls resembling a funnel. Fig. 4 shows more clearly the manner in which the walls of the housing structure 1 extend in substantially flat spaced parallel relation and enlarge into a valve chamber 3 at one end thereof. The valve chamber 3 has a pair of sections one of which I have designated as an upper recessed section 4, and the other of which I have designated as the lower valve section 5. The upper recessed section 4 is adapted to receive the light weight ball valve 6 which is normally retained in the upper recessed section 4 by the gas flow, designated at 7, flowing through the supply connection 2. Under all normal operating conditions the ball valve 6 occupies the position illustrated in Fig. 1 and is maintained in that position by the velocity impact resulting from the normal flow of gas.

The lower valve section 5 has a screw threaded outlet 8 formed adjacent thereto in the end of the valve housing 1. An angular valve seat 9 externally screw-threaded to enter the internal screw threads 8 is engaged in the end of the valve housing and is provided with a rounded seat 10 therein against which ball valve 6, when in the gravitated position illustrated in Figs. 2 and 3, is adapted to seat and provide a seal. The valve seat 9 is centrally recessed at 11 and is internally screw-threaded at 12. The internal screw thread 12 is engaged by the end of a coupling pipe 14 having a flanged end 15 thereon. A screw-threaded coupling member 16 is engaged over coupling pipe 14 and retained in position by screw-threaded flange 15 enabling a connection to be made with the gas intake connection of a gas heater, stove, or other gas-consuming appliance. The aperture 11 in the rounded seat 10 permits a free passage for the flow of gas from gas supply connection 2 through the coupling pipe 14 and the gas heater, stove or other gas-consuming appliance while the ball valve is in the position illustrated in Fig. 1, during all normal conditions of gas flow.

The lower portion of the valve housing 1 is apertured at 17 and internally screw-threaded to receive the externally screw-threaded plug member 18. The externally screw-threaded plug member 18 is provided with a cylindrical screw-threaded projection 19 on the lower extremity thereof surrounding the axial bore 20 through the plug member 18 for the passage of operating rod 21 of the valve raise and rest mechanism. Rod 21 has a substantial cup-shaped member 22 on the upper end thereof for supporting and lifting the ball valve 6. Rod 21 raises through bore 20 and through a pressure sealing gasket 23 and through an opening in the closure cap 24 which engages the screw-threaded projection 19 on plug member 18. By adjusting closure cap 24 with respect to projection 19 of plug 18, sealing gasket 23 may be maintained in pressure sealing relation to the slidable rod 21 for preventing leakage of gas from valve housing 1. A compression coil spring 25 surrounds rod 21 and is disposed between the manually controllable head 26 thereof and closure cap 24. Compression coil spring 25 tends to eject rod member 21 outwardly from valve housing 1 in the position illustrated in Figs. 2 and 3. The plug 18 is provided with an internally arranged central recess 27 therein which is shaped complementary to the underface of cup-shaped member 22, so that when rod 21 is in its ejected position shown in Figs. 2 and 3, the cup-shaped member 22 is disposed in alignment with the end of the inclined plane formed by the funnel-shaped throat of the valve housing 1, and so positions ball valve 6 that the ball valve rolls in a natural manner in gravitating from the position illustrated in Fig. 1 to the position illustrated in Figs. 2 and 3, where the ball valve 6 seats directly against the rounded seat 10 forming a tight seal against the flow of gas 7.

In Fig. 5 I have illustrated the gas safety valve of my invention installed between the gas supply line 30 and the gas burner 31 of the gas heater 32. So long as the gas flow continues, burner 31 is activated. The velocity of the gas flow blows the light ball valve 6 into the recessed section 4. However, upon failure of the gas supply at pipe line 30, the ball valve 6 drops by gravity to the floor of the valve where it rests upon cup-shaped member 22 and seats against the rounded valve seat 10. In the event that the gas supply is re-established at supply line 30 the gas cannot escape through the unlighted burner 31, because ball valve 6 is maintained as an obstruction in the path of flow of the gas, as the gas cannot enter through the bore extending through aperture 11 or coupling pipe 14. An increase in pressure merely increases the tightness of the seal of ball valve 6 against seat 10.

When the gas supply is reestablished the valve raising device is actuated manually by pressing upon manual actuator 26 against the pressure exerted by compression coil spring 25 raising ball valve 26 to the position shown in Fig. 1, where it is blown by the velocity impact of the gas flow 7 into the recessed section 4 of valve housing 1. Burner 31 is then regulated and normal operation continues with the gas flow maintaining ball valve 6 in the recessed section 4 and with the compression coil spring 25 ejecting the manually controlled reset mechanism to the position illustrated in Figs. 2 and 3.

It will be observed that the interior walls of the housing 1 are rounded at the positions 1b and 1c to allow the ball valve 6 to roll forward into the valve housing as it gravitates downwardly to the gas sealing position shown in Figs. 2 and 3. Thus the ball valve is guided and confined within a relatively narrow path of movement and is not subject to be blown by the velocity impact of gas flow to any position except the remote unobstructed flow position of Fig. 1 or the gas sealing position of Figs. 2 and 3.

While I have described my invention in one of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A gas safety valve comprising a valve housing having a gas supply connection at one end thereof and a gas discharge connection at the opposite end thereof, said valve housing having spaced flat substantially parallel walls tapering from said gas supply connection, an enlarged vertically extending section at the end thereof adjacent said gas discharge connection and having in said enlarged section a pair of spaced recesses, one of said recesses forming a partially spherical ball seat and the other of said recesses forming a partially spherical valve seat aligned one above the other on different horizontal levels, said valve seat being ported in alignment with said gas discharge connection, a lightweight ball valve displaceable between said ball seat, said valve seat, and a ball valve lifting device comprising a rod member projectable externally of said valve housing and movable in a path aligned diametrically with said partially spherical valve seat and said partially spherical ball seat, a ball valve carrier on said rod member, and spring-actuated means for normally ejecting said rod member to a position in which the ball valve carrier is maintained in substantially streamlined relation to the interior wall of said housing preparatory to a lifting operation in which the ball seated upon said ball valve carrier may be lifted into an elevated position and maintained in said ball seat under velocity impact of gas flow, and guide means on said side walls for directing said lightweight ball valves in a vertical path.

2. A gas safety valve comprising a relatively flat tapered valve housing having a pair of substantially parallel spaced side walls and terminating at one end in a gas supply connection and an enlarged interior at the other end, said last mentioned end including a pair of spaced vertically aligned recesses, one of said recesses forming a partially spherical ball seat and the other of said recesses forming a partially spherical ball valve seat, a gas discharge connection having a port axially and horizontally aligned with said ball valve seat, a lightweight ball valve displaceable within the enlarged section of said valve housing from a position aligned with the ball valve seat to a position aligned with said ball seat, and means extending transversely of said valve housing in a diametrical path across said spaced vertically aligned recesses in alignment with the ball valve for raising the ball valve from a position obstructing gas flow through the port in said gas discharge connection to a position retained in said ball seat by the velocity of gas flow from the gas supply connection to the gas discharge connection, said substantially parallel spaced side walls being rounded at their junction with said enlarged interior and serving as a vertical guide for said lightweight ball valve.

3. A gas safety valve comprising a relatively flat tapered valve housing having a pair of substantially parallel spaced side walls and terminating at one end in a gas supply connection and an enlarged vertically extending interior at the other end, said last mentioned end including a pair of partially spherical recesses, one of said recesses forming a ball seat and the other of said recesses forming a ball valve seat, a gas discharge connection having a port axially aligned with said valve seat, a lightweight ball valve displaceable within the enlarged section of said valve housing from a position aligned with said ball valve seat to a position aligned with the ball seat, a carrier for said ball valve, spring means for normally maintaining said carrier in streamlined relation to the interior wall of the enlarged interior of said housing for enabling the ball valve to be seated in gas sealing relation to the port in said ball valve seat, said carrier being projectable inwardly with respect to said valve housing for lifting the ball valve to a position in which the velocity of gas flow maintains said ball valve in said valve seat out of flow obstructing position with respect to the flow of gas from said gas supply connection to said gas discharge connection, and guide means on said side walls for directing said lightweight ball valve into a vertical path.

FREDERIC J. SHOOK.

REFERENCES CITED

The following references are of record in the file of this patent:

UNITED STATES PATENTS

| Number | Name | Date |
|---|---|---|
| 871,783 | Cleveland | Nov. 26, 1907 |
| 971,295 | Menear | Sept. 27, 1910 |
| 1,013,695 | Storer | Jan. 12, 1912 |
| 1,034,995 | Gannon | Aug. 6, 1912 |
| 1,099,032 | Fraser | June 2, 1914 |
| 1,106,427 | Taylor | Aug. 11, 1914 |
| 1,786,848 | Johnson | Dec. 30, 1930 |

FOREIGN PATENTS

| Number | Country | Date |
|---|---|---|
| 187,467 | Great Britain | Oct. 26, 1922 |